(12) United States Patent
Sakai

(10) Patent No.: US 8,184,337 B2
(45) Date of Patent: May 22, 2012

(54) IMAGE PROCESSING APPARATUS AND METHOD TO OUTPUT A PRINT IMAGE EMBEDDED WITH INFORMATION INDICATING A REGION OBTAINED BY MERGING A REGION ON AN INPUT IMAGE CORRESPONDING TO A SPECIFIED IMAGE REGION, AND A SURROUNDING REGION OF THAT REGION ON THE INPUT IMAGE

(75) Inventor: Hiroyuki Sakai, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 565 days.

(21) Appl. No.: 12/399,237

(22) Filed: Mar. 6, 2009

(65) Prior Publication Data

US 2009/0231630 A1 Sep. 17, 2009

(30) Foreign Application Priority Data

Mar. 17, 2008 (JP) ................... 2008-068353

(51) Int. Cl.
*H04N 1/387* (2006.01)
*G06K 15/02* (2006.01)
(52) U.S. Cl. ........ 358/1.9; 358/3.28; 358/1.18; 358/453
(58) Field of Classification Search ................... 358/1.9, 358/3.24, 3.28, 1.18, 526, 528, 537, 538, 358/540, 449, 451, 452, 453; 347/107
See application file for complete search history.

(56) References Cited

U.S. PATENT DOCUMENTS

2008/0144052 A1* 6/2008 Sakai et al. ................... 358/1.5
2008/0205697 A1* 8/2008 Sakai et al. ................... 382/100

FOREIGN PATENT DOCUMENTS

| JP | 10-126607 A | 5/1998 |
|---|---|---|
| JP | 3554753 | 5/2004 |
| JP | 2005-210543 A | 8/2005 |
| JP | 2006-128852 A | 5/2006 |

OTHER PUBLICATIONS

Japanese Office Action dated Jan. 23, 2012, in counterpart Japanese Application No. 2008-068353.

* cited by examiner

*Primary Examiner* — Scott A Rogers
(74) *Attorney, Agent, or Firm* — Fitzpatrick, Cella, Harper & Scinto

(57) ABSTRACT

An output image forming unit generates a print image based on an input image. A partial region image forming unit specifies an image region, which is not to be printed when the print image is printed on a print sheet, and generates region information indicating a region obtained by merging a region on the input image corresponding to the specified image region, and a surrounding region of this region on the input image. The partial region image forming unit generates embedded information including the region information. An additional information multiplexing unit embeds the embedded information in the print image, and outputs that print image to a printer.

14 Claims, 13 Drawing Sheets

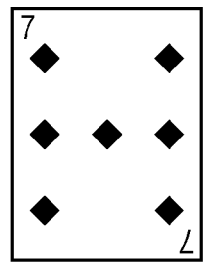
F I G. 8A
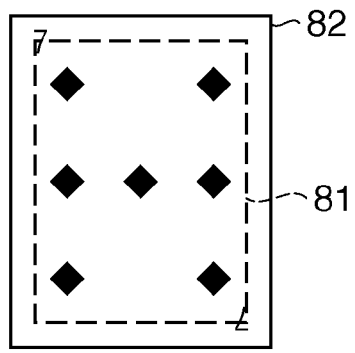
F I G. 8B
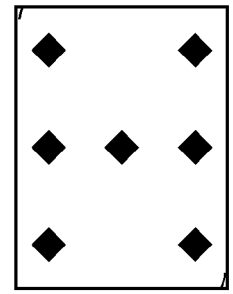
F I G. 8C
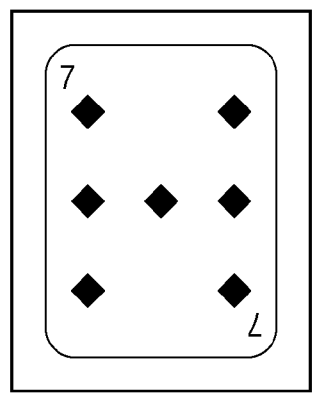
F I G. 9A
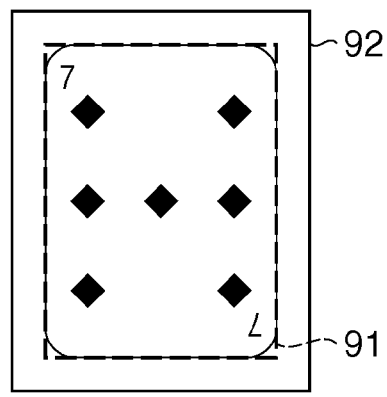
F I G. 9B
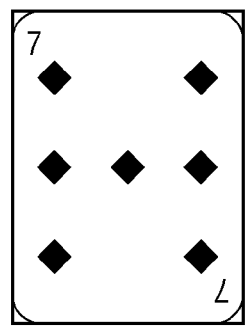
F I G. 9C

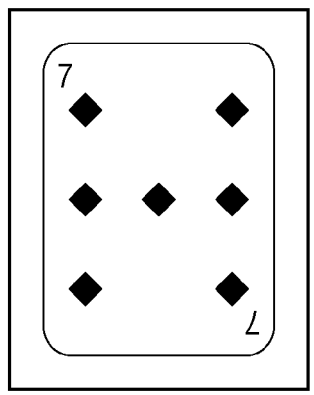 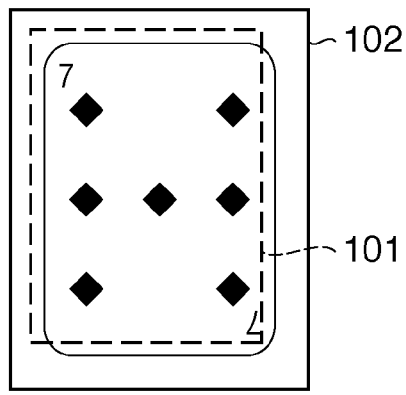 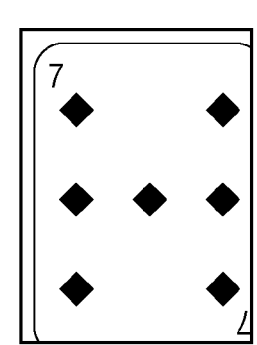
FIG. 10A    FIG. 10B    FIG. 10C
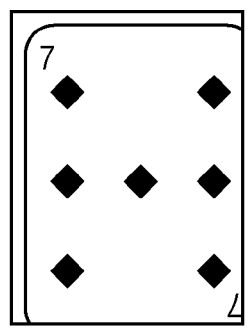 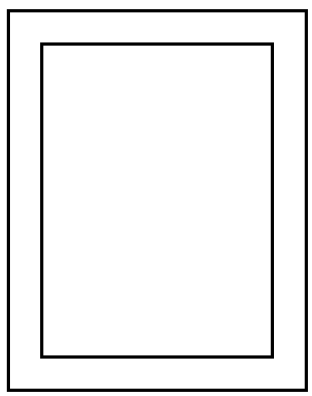 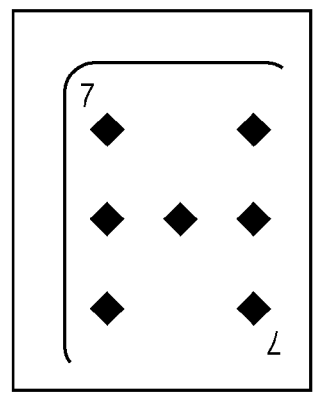
FIG. 11A    FIG. 11B    FIG. 11C

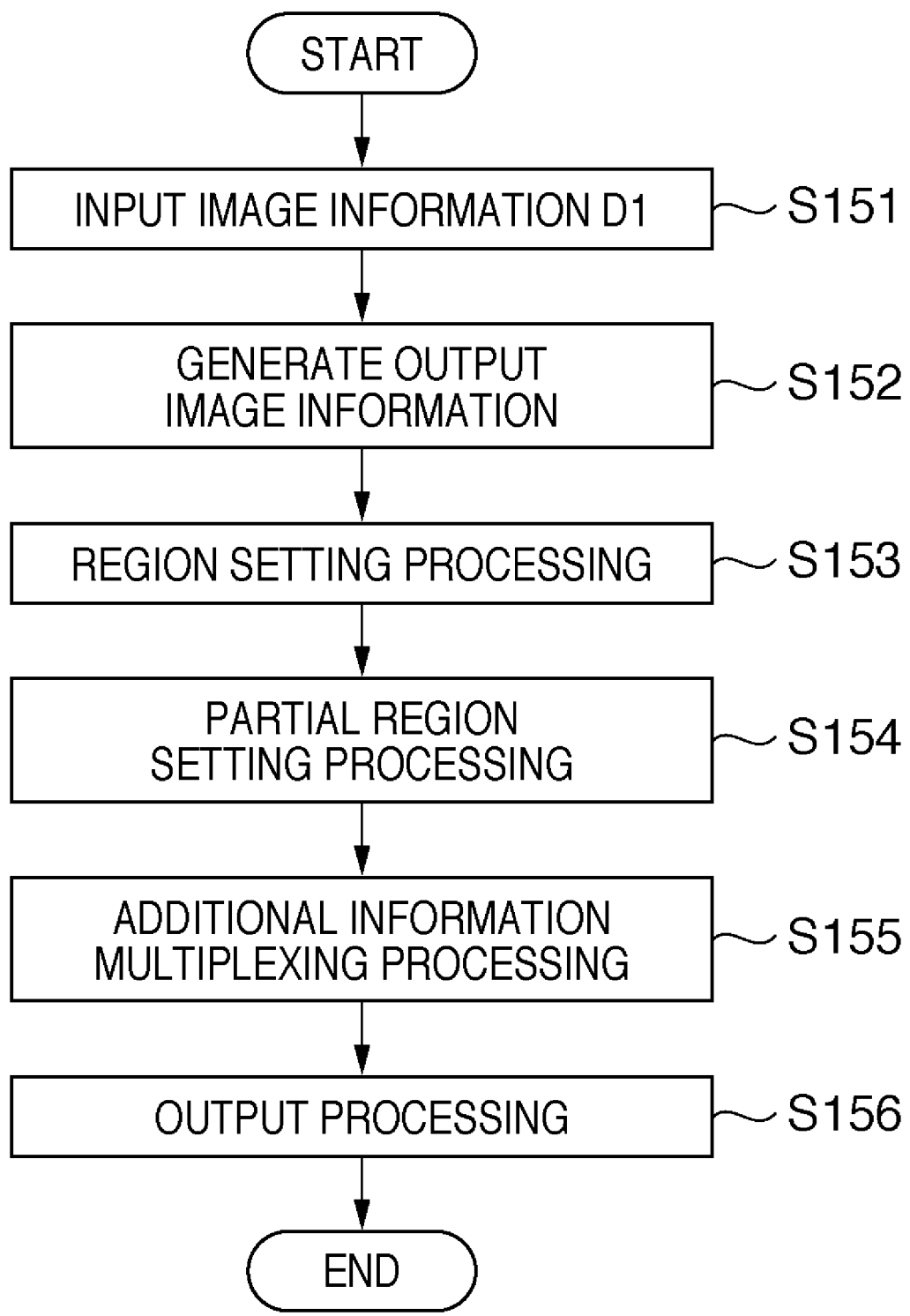

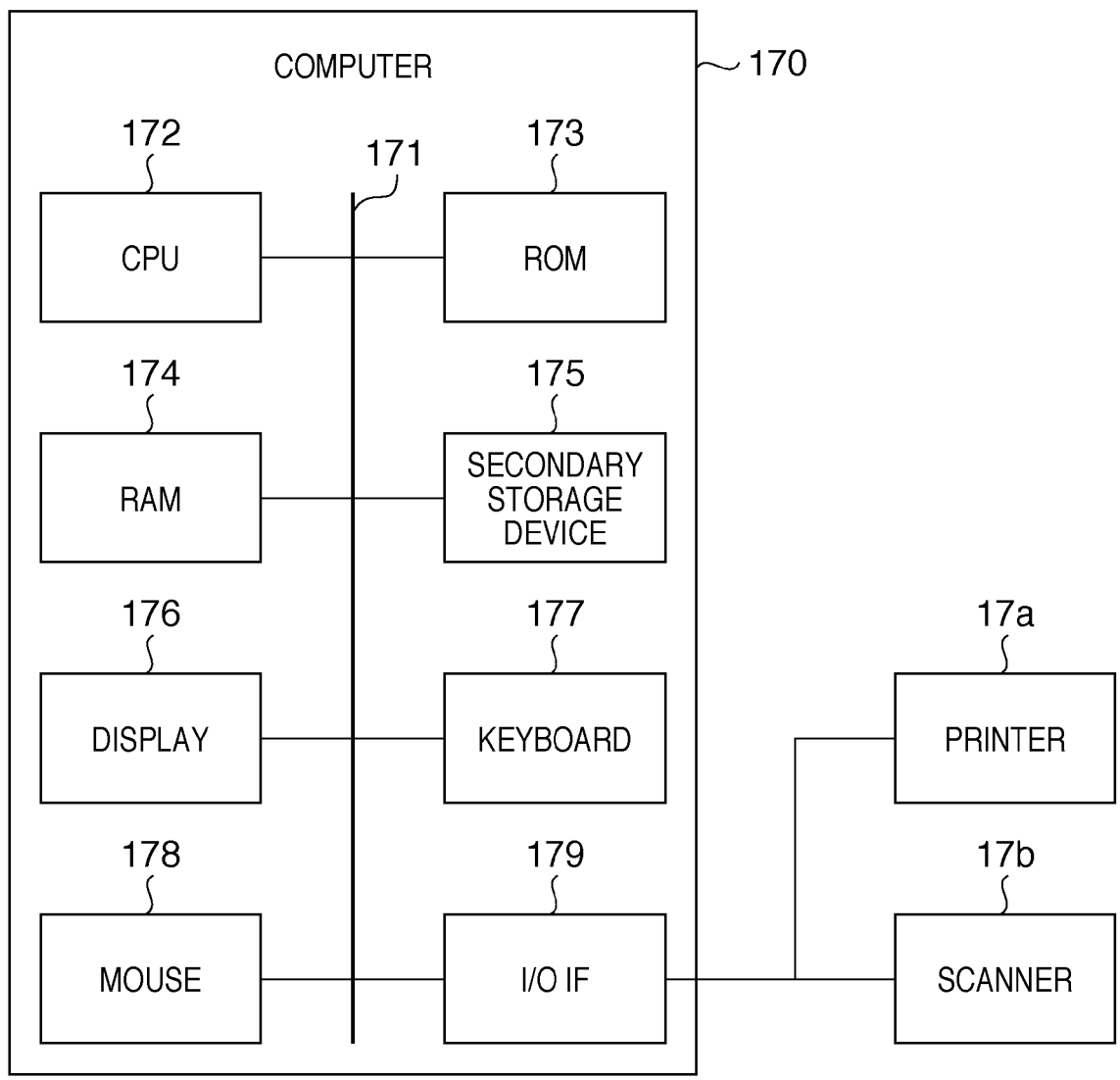
F I G. 17

IMAGE PROCESSING APPARATUS AND METHOD TO OUTPUT A PRINT IMAGE EMBEDDED WITH INFORMATION INDICATING A REGION OBTAINED BY MERGING A REGION ON AN INPUT IMAGE CORRESPONDING TO A SPECIFIED IMAGE REGION, AND A SURROUNDING REGION OF THAT REGION ON THE INPUT IMAGE

BACKGROUND OF THE INVENTION

1. Field of the Invention

The present invention relates to an image print technique.

2. Description of the Related Art

In recent years, image printing devices having a borderless print function of printing an image on the full surface of a sheet upon printing image data captured by a digital camera, a portable phone with a camera, and the like are increasing, and demand for borderless printing are increasing.

Since the performance of image reading devices has improved, demand for reading a printed image using an image reading device such as a copying machine or scanner, and printing the read image again are also increasing.

Furthermore, demand for reading an image of a borderless-printed sheet using an image reading device, and borderless-printing the read image again are increasing.

A method of executing borderless-print processing using a conventional image printing device, reading an image of a borderless-printed sheet using an image reading device, and borderless-printing the read image again will be described below.

Upon execution of borderless-print processing using a conventional image printing device, a maximum image size printable on the full surface of a print sheet is calculated based on the size of the print sheet and a resolution. Then, a size slightly larger than the maximum image size printable on the full surface of the sheet is set as an output image size. An input image is enlarged or reduced to fit the output image size. As shown in FIG. 4, an output image 42 is printed so that a print sheet 41 is located inside the output image 42, thus realizing the borderless-print by creating a state in which no non-printed part is formed on the print sheet 41.

For example, when resolution is expressed by dpi (dots per inch), and a case will be explained below wherein the size (vertical×horizontal) of an input image is 1600×1200 dots, the size (vertical×horizontal) of a print sheet is 4×3 inches, and the resolution is 600 dpi. The maximum image size printable on the full surface of the print sheet is 2400×1800 dots by multiplying the size of the print sheet by the resolution. Assuming that an output image size (vertical×horizontal) is obtained by adding 20 dots to the maximum image size printable on the full surface of the print sheet in both the vertical and horizontal directions, it is 2420×1820 dots. Therefore, processing for enlarging the input image to exceed 2420×1820 dots is executed. This enlargement processing uses interpolation processing, such as linear interpolation processing, to have the same enlargement ratios in the vertical and horizontal directions, and executes interpolation processing so that 1600×1200 dots exceed 2420×1820 dots. In the aforementioned case, the input image is enlarged in correspondence with the enlargement ratio (1820/1200 times) of the short side, thus generating an output image of 2427×1820 dots. The print sheet is set at a position where it falls inside the output image, and the borderless-print processing is executed so that the output image is partially deleted.

When an image of the borderless-printed print sheet is read by a conventional image reading device, and the borderless-print processing of the read image is executed again, the borderless-printed print sheet is converted into image data using an image sensor. The read image data is stored in a memory. Then, a method of executing borderless-print processing using the conventional image printing device again to have the image data stored in the memory as an input image is available.

For example, when an image of a print sheet borderless-printed by the conventional image printing device is read at a read resolution of 600 dpi, the size of the read image data is 2400×1800 dots. Upon execution of the borderless-print processing again, the read image data (having the size of 2400×1800 dots) is used as an input image. In the conventional image printing device, the output image size is set to be slightly larger than the maximum image size printable on the full surface of the print sheet. Therefore, the output image size (vertical×horizontal) is set to be 2420×1820 dots. Then, the read image data undergoes enlargement processing for enlarging it to image data of a size larger than 2420×1820 dots, thus generating an output image. A print sheet is set at a position where the print sheet falls inside the output image, thus implementing the borderless-print processing again so that the output image is partially deleted.

However, when borderless-print processing is executed again using the borderless-printed print sheet using the conventional image printing device and image reading device, the first borderless-printed result is different from the second borderless-print result. Such difference will be described below with reference to FIGS. 7A to 7C and FIGS. 8A to 8C. FIGS. 7A to 7C are views for explaining the processes of the first borderless-print processing using the conventional image printing device. FIGS. 8A to 8C are views for explaining the processes of the second borderless-print processing using a borderless-printed image by the conventional image printing device.

FIG. 7A shows an original image (input image) used in the first borderless-print processing. FIG. 7B shows an image 72 obtained by converting the original image into an image of a size larger than a print sheet 71, and the print sheet 71. FIG. 7C shows a result obtained when only a region of the image 72 that overlaps the print sheet 71 is printed on the print sheet 71.

FIG. 8A shows an input image used in the second borderless-print processing. This input image is obtained by reading an image of the print sheet as the print result shown in FIG. 7C using the image reading device, extracting only a print sheet part of the read image, and converting the extracted print sheet part into image data. FIG. 8B shows an image 82 obtained by converting the input image into an image of a size larger than a print sheet 81, and the print sheet 81. FIG. 8C shows a result obtained when only a region of the image 82 that overlaps the print sheet 81 is printed on the print sheet 81.

In the first borderless-print processing, the original image shown in FIG. 7A is received, and is enlarged to the image 72 of a size larger than the print sheet 71. Then, the print sheet 71 is aligned to fall inside the enlarged image 72, and the positional relationship between the image 72 and print sheet 71 is set in the state shown in FIG. 7B. Then, the image 72 is printed after a region outside the print sheet 71 and inside the image 72 is deleted, thus obtaining the print result shown in FIG. 7C.

In the second borderless-print processing using a borderless-printed image, an image (FIG. 8A) obtained by reading a print sheet on which the print result shown in FIG. 7C is printed as the first borderless-print result is read by the image reading device and is used as an input image. Then, this input image is enlarged to the image 82 of a size larger than the print sheet 81. The print sheet 81 is aligned to fall inside the image 82, and the positional relationship between the image 82 and print sheet 81 is set in the state shown in FIG. 8B. Then, the image 82 is printed after a region outside the print sheet 81 and inside the image 82 is deleted, thus obtaining the print result shown in FIG. 8C.

Therefore, as can be seen from the print results shown in FIGS. 7C and 8C, the first borderless-print result is different from the second borderless-print result, thus posing a problem.

In order to solve this problem, a technique which embeds only a region to be deleted using a digital watermark technique has been proposed (Japanese Patent No. 3554753). According to Japanese Patent No. 3554753, a region to be partially deleted is set on an input image. Then, an edit image is obtained by deleting the set region from the input image. The image of the set region is compressed and is embedded in the edit image. After that, the edit image is output.

When the borderless-print processing is executed again using a borderless-printed sheet to obtain the same borderless-print image by the aforementioned method, data to be deleted by the borderless-print processing has to be embedded in advance in the borderless-printed sheet. Then, the image reading device reads a borderless-printed image to restore the embedded "data to be deleted by borderless-print processing". Image data obtained by reading the borderless-printed image is merged with the restored "data to be deleted" to restore an input image before the borderless-print processing. When the restored input image is borderless-printed again, a borderless-printed image having the same size can be obtained.

However, in the aforementioned conventional method, a region to be deleted at the time of the borderless-print processing has to be set in advance. However, in a printer in which the user places a print sheet on a document table to execute print processing, it is easy to assume that the position where the print sheet is to be placed is easily shifted. Therefore, since it is assumed that the region to be deleted at the time of the borderless-print processing is also easily shifted, it is difficult to set the region to be deleted in advance. Such difficulty will be described below with reference to FIGS. 9A to 9C and FIGS. 10A to 10C.

FIGS. 9A to 9C are views for explaining a case in which a print region which is set in advance upon execution of borderless-print processing matches that in the borderless-print result. FIG. 9A shows an input image which is input to be borderless-printed. FIG. 9B shows an image 92 obtained when the input image is converted into the image 92 having a size larger than a print sheet 91, and the print sheet 91. The print sheet 91 also shows a print region which is set in advance. FIG. 9C shows a result obtained when only a region of the image 92 that overlaps the print sheet 91 is printed on the print sheet 91.

FIGS. 10A to 10C are views for explaining a case in which a print region which is set in advance upon execution of borderless-print processing does not match that in the borderless-print result. FIG. 10A shows an input image which is input to be borderless-printed. FIG. 10B shows an image 102 obtained when the input image is converted into the image 102 having a size larger than a print sheet 101, and the print sheet 101. Since the print sheet 101 is placed at a shifted position, the positional relationship with the image 102 is different (shifted) from that between the image 92 and print sheet 91 shown in FIG. 9B. FIG. 10C shows a result obtained when only a region of the image 102 that overlaps the print sheet 101 is printed on the print sheet 101.

FIGS. 9A to 9C and FIGS. 10A to 10C show the case free from any positional shift of the print sheet and the case that suffers a positional shift when the same input image is input and is borderless-printed using printers having the same print performance. As can be seen from the print results shown in FIGS. 9C and 10C, different print results are obtained due to the positional shift of the print sheet.

Assume that a printed print sheet is read using the image reading device, additional information is extracted from the read image, and the extracted information is restored. This additional information indicates a delete region which is set in advance. In this case, a case will be described below wherein an original image cannot be restored by compositing the read image and an image of the restored delete region which is set in advance.

FIGS. 11A to 11C are views for explaining an example in which a document, which is printed on a print sheet whose position is shifted, is read, additional information is extracted from the read document image to restore an image, and the restored image and the read document image are composited.

The additional information indicates a delete region which is set in advance, i.e., a region obtained by excluding a region of the print sheet 91 from that of the image 92 shown in FIG. 9B. Assume that an input image before being printed on a print sheet whose position is shifted is the image 102 shown in FIG. 10A, and a print sheet which has undergone the print processing with the print sheet position shifted is the print result shown in FIG. 10C.

FIG. 11A shows an image as a result of reading a print sheet which has undergone the borderless-print processing with the print sheet position shifted using the image reading device. FIG. 11B shows an image as a result of extracting additional information from the image shown in FIG. 11A, and restoring the additional information. FIG. 11C shows an image as a result of compositing the image shown in FIG. 11A and that shown in FIG. 11B.

As can be seen from the result shown in FIG. 11C, the input image (FIG. 10A) before the borderless-print processing cannot be restored.

Therefore, when the position of a print sheet is shifted even slightly from a delete region which is set in advance, even when data of only the region to be deleted is saved, it is very difficult to restore an input image before the borderless-print processing. When the embedded delete region is restored and is composited with an image read using the image reading device, it is difficult to composite these images by aligning them in a state in which the delete region which is set in advance is shifted.

SUMMARY OF THE INVENTION

The present invention has been made in consideration of the aforementioned problems, and has as its object to provide a technique for executing print processing so that a print material as a result of borderless-print processing becomes the same as that as a result of reading that print material and executing the borderless-print processing of the read image again.

According to the first aspect of the present invention, an image processing apparatus comprises a unit which generates a print image based on an input image; a generation unit which specifies an image region, which is not to be printed when the print image is printed on a print sheet, and generates region information indicating a region obtained by merging a region on the input image corresponding to the specified image region, and a surrounding region of that region on the input image; a unit which generates embedded information including the region information; a unit which embeds the embedded information in the print image; and a unit which outputs the print image embedded with the embedded information to a printing device.

According to the second aspect of the present invention, an image processing apparatus comprises a unit which generates a print image based on an input image; a generation unit which specifies an image region, which is not to be printed when the print image is printed on a print sheet, and generates region information indicating a region obtained by merging a region on the input image corresponding to the specified image region, and a surrounding region of that region on the input image; a unit which generates embedded information including the region information; a unit which embeds the embedded information and alignment information in the print image; and a unit which outputs the print image embedded with the embedded information and the alignment information to a printing device.

According to the third aspect of the present invention, an image processing method comprises a step of generating a print image based on an input image; a generation step of specifying an image region, which is not to be printed when the print image is printed on a print sheet, and generating region information indicating a region obtained by merging a region on the input image corresponding to the specified image region, and a surrounding region of that region on the input image; a step of generating embedded information including the region information; a step of embedding the embedded information in the print image; and a step of outputting the print image embedded with the embedded information to a printing device.

According to the fourth aspect of the present invention, an image processing method comprises a step of generating a print image based on an input image; a generation step of specifying an image region, which is not to be printed when the print image is printed on a print sheet, and generating region information indicating a region obtained by merging a region on the input image corresponding to the specified image region, and a surrounding region of that region on the input image; a step of generating embedded information including the region information; a step of embedding the embedded information and alignment information in the print image; and a step of outputting the print image embedded with the embedded information and the alignment information to a printing device.

Further features of the present invention will become apparent from the following description of exemplary embodiments with reference to the attached drawings.

BRIEF DESCRIPTION OF THE DRAWINGS

FIGS. 8A to 8C are views for explaining the processes of the second borderless-print processing of a borderless-printed image by the conventional image printing device;

FIGS. 9A to 9C are views for explaining a case in which a print region which is set in advance upon execution of borderless-print processing matches that in the borderless-print result;

FIGS. 10A to 10C are views for explaining a case in which a print region which is set in advance upon execution of borderless-print processing does not match that in the borderless-print result;

FIGS. 11A to 11C are views for explaining an example in which a document, which is printed on a print sheet whose position is shifted, is read, additional information is extracted from the read document image to restore an image, and the restored image and the read document image are composited;

FIG. 15 is a flowchart showing processing to be executed by the image output device according to the first embodiment of the present invention;

FIG. 17 is a block diagram showing an example of the hardware arrangement of a computer which is applicable to the image output device and image reading device.

DESCRIPTION OF THE EMBODIMENTS

Preferred embodiments of the present invention will be described in detail hereinafter with reference to the accompanying drawings. Note that these embodiments will be explained as examples of the preferred arrangements of the invention described in the scope of the claims, and the invention is not limited to the embodiments to be described hereinafter.

First Embodiment

This embodiment will explain an image processing apparatus including an image output device which embeds additional information in an image, and prints the image, and an image reading device which reads a print sheet on which the image embedded with the additional information is printed. Note that this embodiment will explain the image processing apparatus including the image output device and image reading device. However, when the image output device and image reading device are independent devices, the following description is substantially the same. When the image output device and image reading device are independent devices, these devices have to be configured to allow data communication which may be either wired or wireless communications.

<Overview of Image Output Device>

An overview of the image output device according to this embodiment will be described first.

Figure 1:
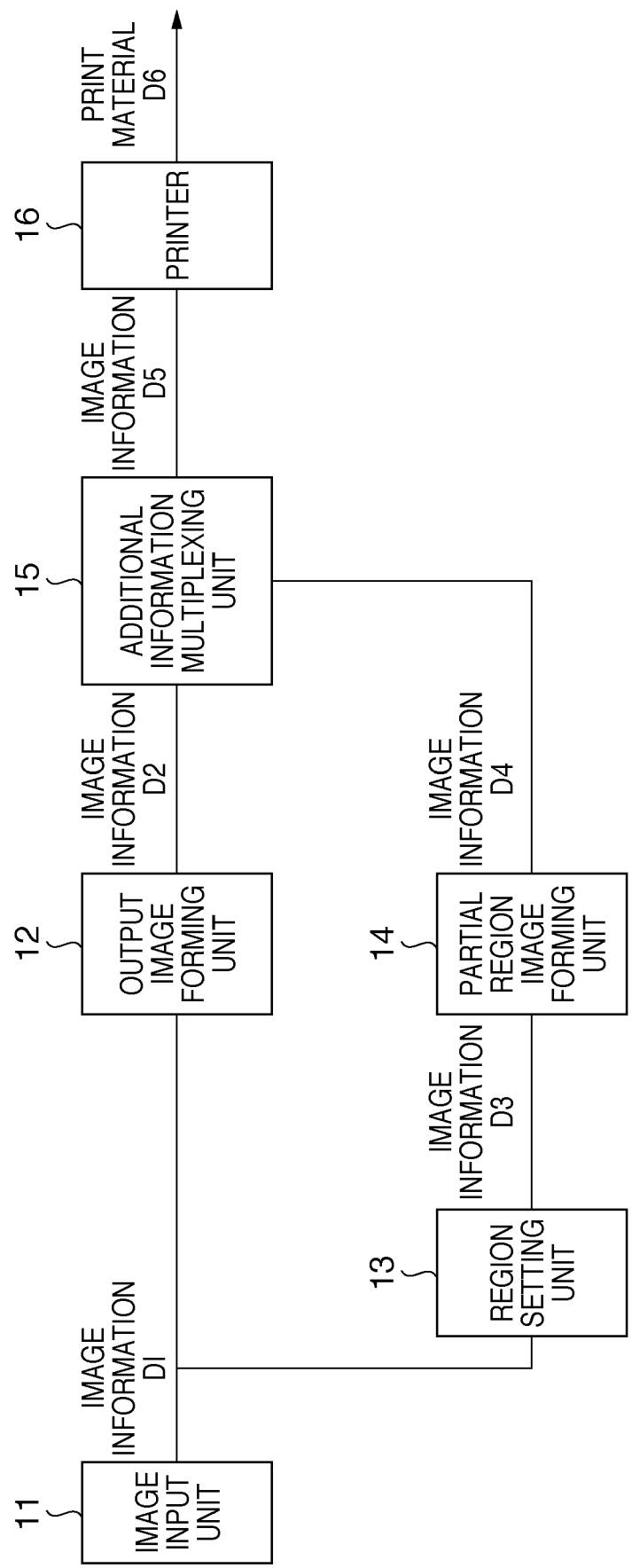
FIG. 1 is a block diagram showing an example of the functional arrangement of an image output device according to the first embodiment of the present invention.

FIG. 1 is a block diagram showing an example of the functional arrangement of the image output device according to this embodiment. As shown in FIG. 1, the image output device according to this embodiment includes an image input unit 11, an output image forming unit 12, a region setting unit 13, partial region image forming unit 14, an additional information multiplexing unit 15, and a printer 16.

FIG. 15 is a flowchart of processing to be executed by the image output device according to this embodiment.

In step S151, the image input unit 11 receives image information D1, and outputs the received information to the subsequent output image forming unit 12 and region setting unit 13. The image information D1 includes print setting information (size information indicating the size of a print sheet, print resolution information indicating a print resolution, flag information indicating whether or not to execute borderless-print processing, layout information, etc.), and image data of an input image.

In step S152, the output image forming unit 12 executes resolution transformation of the image data of the input image included in the image information D1 using the print setting information in the image information D1. The output image forming unit 12 outputs the image data after the resolution transformation to the subsequent additional information multiplexing unit 15 as image information D2. Although not shown in FIG. 1, the output image forming unit 12 also outputs the image information D1 received from the image input unit 11 to the additional information multiplexing unit 15.

Upon reception of the image information D1, the region setting unit 13 sets a non-print target region and surrounding region of that region in the input image included in the image information D1 using the print setting information in the image information D1 in step S153. Then, the region setting unit 13 generates region setting information indicating a region (partial region) formed by merging these set regions, and outputs image information D3 including the generated region setting information and the image information D1 received from the image input unit 11 to the subsequent partial region image forming unit 14.

In step S154, the partial region image forming unit 14 specifies a partial region in the input image included in the image information D1 received from the region setting unit 13 using the region setting information included in the image information D3 received from the region setting unit 13. Then, the partial region image forming unit 14 generates image information D4 including an image that indicates the specified partial region, and outputs the generated image information D4 to the subsequent additional information multiplexing unit 15.

In step S155, the additional information multiplexing unit 15 generates image information D5 by embedding the image information D4 in an image as the image information D2. Such embedding uses, for example, quantization processing.

In step S156, the additional information multiplexing unit 15 outputs the generated image information D5 to the printer 16. As a result, the printer 16 prints the image embedded with the image information D4 as additional information on a print sheet with the designated size. The printer 16 outputs a print material D6 formed by printing the image embedded with the image information D4 as the additional information on the print sheet with the designated size.

Note that the image information D5 is directly output to the printer 16 for the sake of simplicity. Alternatively, the image information D5 may be converted into print information such as a page description language, and may then be output to the printer 16.

The respective units shown in FIG. 1 will be described in more detail below.

<Output Image Forming Unit 12>

As described above, the output image forming unit 12 executes the resolution transformation of the input image. The resolution transformation can use various techniques. For example, a technique such as nearest neighbor interpolation or linear interpolation as a state-of-the-art technique is used.

In order to explain the practical operation of the output image forming unit 12, assume that, for example, the image input unit 11 inputs a JPEG image of 1600×1200 dots as an input image. Also, assume that the image input unit 11 inputs the print setting information including size information "4×3 inches", print resolution information "600 dpi", and flag information "to execute borderless-print processing".

In this case, the output image forming unit 12 executes decode processing of the JPEG image (input image) to obtain image data in which each pixel is expressed by 24-bit RGB data. The output image forming unit 12 calculates a maximum image size printable on the full surface of a print sheet based on the size of the print sheet and the print resolution. Since the size of the print sheet is 4×3 inches, and the print resolution is 600 dpi, the maximum image size of 2400×1800 dots is calculated.

In the borderless-print processing, the size of an image (output image) to be output to the printer 16 is set to be larger than the print sheet. For example, the output image size is set to be 2420×1820 dots if it is defined by adding 20 dots to the maximum image size in the vertical and horizontal directions. Therefore, the output image forming unit 12 executes processing for enlarging (resolution-transforming) the image after the decode processing to an image of a size defined by adding 20 dots to the maximum image size in the vertical and horizontal directions. The output image forming unit 12 outputs the image after the resolution transformation, i.e., the image obtained by enlarging the input image to the size defined by adding 20 dots to the maximum image size in the vertical and horizontal directions to the additional information multiplexing unit 15 as the image information D2.

In the above description, the size defined by adding 20 dots to the maximum image size of the print sheet in the vertical and horizontal directions is set as the output image size. However, since the size of a region that protrudes from the print sheet varies depending on the performance of the printer 16 and the print setting information such as the print sheet size, the output image size is not particularly limited.

<Region Setting Unit 13>

As described above, the region setting unit 13 sets a non-print target region and a surrounding region of that region in the input image using the print setting information in the image information D1.

In order to practically explain the region setting processing in the region setting unit 13, a case will be described below with reference to FIG. 5 and FIGS. 6A and 6B, wherein a region which protrudes from the print sheet upon execution of borderless-print processing and its surrounding region in an output image are set.

Figure 5:
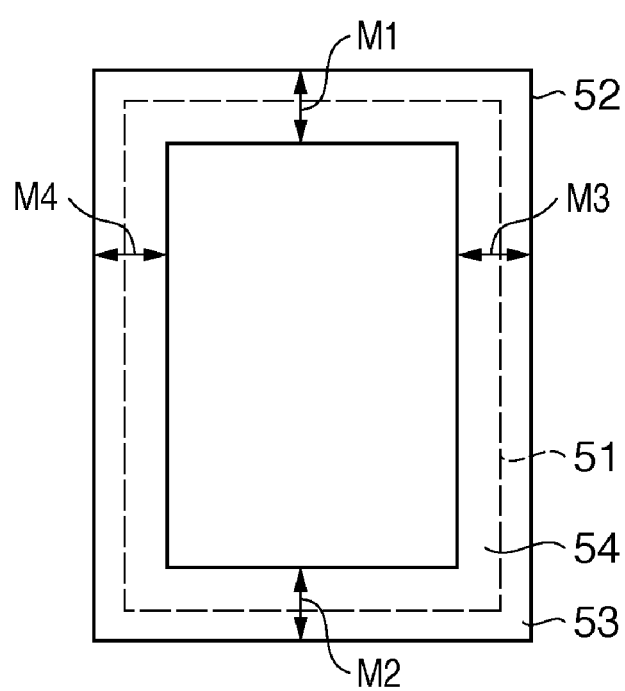
FIG. 5 is a view showing a non-print target region (a region that protrudes from a print sheet), and its surrounding region in an output image upon executing borderless-print processing using that output image.

FIG. 5 is a view showing a non-print target region (a region that protrudes from a print sheet), and its surrounding region in an output image upon executing borderless-print processing using that output image.

Figure 6A:
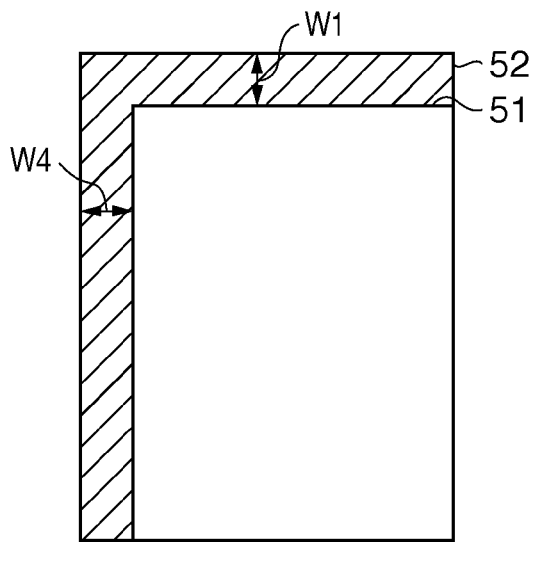
FIGS. 6A and 6B are views showing a method of setting a non-print target region (a region that protrudes from the print sheet), and its surrounding region in an output image upon executing borderless-print processing using that output image.
Figure 6B:
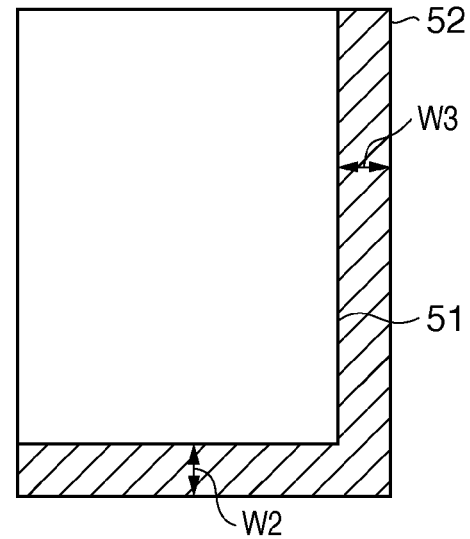
Figure 7A:
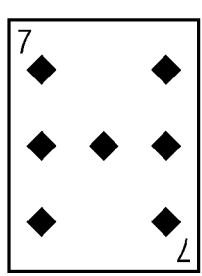
FIGS. 7A to 7C are views for explaining the processes of the first borderless-print processing using a conventional image printing device.
Figure 7B:
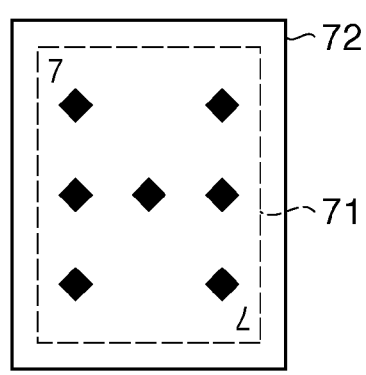
Figure 7C:
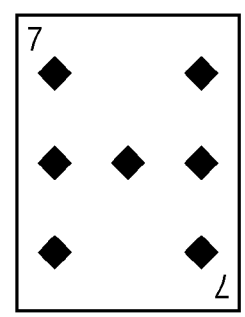

FIGS. 6A and 6B are views showing a method of setting a non-print target region (a region that protrudes from the print sheet), and its surrounding region in an output image upon executing borderless-print processing using that output image.

Referring to FIG. 5, reference numeral 51 denotes a print sheet; and reference numeral 52 denotes an output image. The output image 52 is obtained by enlarging the input image using the print setting information, as described above.

Reference numeral 53 denotes a region of the output image 52 which protrudes from the print sheet 51 upon borderless-printing the output image 52 on the print sheet 51, i.e., a non-print target region. Reference numeral 54 denotes a surrounding region of the non-print target region 53 in the output image 52.

In case of FIG. 5, the region setting unit 13 sets a region obtained by merging the region 53 and surrounding region 54 as the partial region.

As shown in FIG. 5, the region obtained by merging the region 53 as a region outside the print sheet 51 and the surrounding region 54 as a region inside the print sheet 51 is set as the partial region. Reference numerals M1, M2, M3, and M4 respectively denote distances from the top, bottom, right, and left sides of the output image 52 so as to indicate the range of the partial region obtained by merging the region 53 and the surrounding region 54.

An example of a method of determining these distances M1 to M4 will be described below with reference to FIGS. 6A and 6B. As shown in FIG. 6A, when the print sheet 51 is located at the lower right corner of the output image 52, a non-overlapping region (hatched part in FIG. 6A) of the output image 52 and the print sheet 51 is specified. Then, the distance between the top end of the output image 52 and that of the print sheet 51 is calculated as W1, and the distance between the left end of the output image 52 and that of the print sheet 51 is calculated as W4.

Next, as shown in FIG. 6B, when the print sheet 51 is located at the upper left corner of the output image 52, a non-overlapping region (hatched part in FIG. 6B) of the output image 52 and the print sheet 51 is specified. Then, the distance between the bottom end of the output image 52 and that of the print sheet 51 is calculated as W2, and the distance between the right end of the output image 52 and that of the print sheet 51 is calculated as W3. The calculated distances W1 to W4 are set as M1 to M4.

Since the partial region calculated in this way is that on the output image, a region corresponding to this partial region is specified on the input image. More specifically, since the distances M1 to M4 are those on the output image, they are converted into distances M1' to M4' on the input image. The distances M1' to M4' can be simply calculated by multiplying the distances M1 to M4 by (the size of the input image/the size of the output image). The region setting unit 13 sets the distances M1' to M4' as the region setting information, and outputs the image information D3 including this region setting information and the image information D1 to the subsequent partial region image forming unit 14.

In the above description, the partial region is automatically set using the print setting information. However, the partial region may be set manually by the user or based on the print performance of the image output device or the reading performance of the image reading device. That is, a region including at least the non-print target region and its surrounding region need only be set.

In the above description, the partial region is set using the input image before the resolution transformation, but it may be set as a region after the resolution transformation. For example, when the input image is larger than the output image, the size of the set partial region after the resolution transformation becomes larger than that before resolution transformation. Also, as another method, the sizes of the partial regions of the input image and output image may be compared upon embedding, and which of the partial regions before and after the resolution transformation is to be set may be selected based on the size.

<Partial Region Image Forming Unit 14>

As described above, the partial region image forming unit 14 forms an image in a region corresponding to the partial region in the input image as a partial region image. For example, the partial region image forming unit 14 generates, as a partial region image, an image of a region which satisfies requirements of the distance M4' or more from the left end, the distance M3' or more from the right end, the distance M1' or more from the top end, and the distance M2' or more from the bottom end in the input image (a central blank region in FIG. 5), and in which the pixel values of pixels that define this region are set to be zero.

Then, the partial region image forming unit 14 generates the image information D4 including the partial region image formed in this way, input image information indicating the size of the input image in the vertical and horizontal directions, and partial region information (=region setting information) indicating the distances M1' to M4'. The partial region image forming unit 14 outputs the generated image information D4 to the subsequent additional information multiplexing unit 15.

Note that information that can be used as the input image information is not limited to the size of the input image in the vertical and horizontal directions, but it may be information that allows the apparatus to determine the size of the input image. The same applies to the partial region information. That is, the partial region information is not limited to that indicating the distances M1' to M4', but it may be information used to specify the partial region on the input image.

In the above description, pixel data of the input image are used intact as the partial region image. Alternatively, for the purpose of easy restoration later or a reduction of the data size of the partial region image, the image data of the partial region image may be compressed and encoded. For example, known encoding using an error correction code that allows easy restoration may be used. Alternatively, a compression method using DCT (Discrete Cosine Transform) and Huffman encoding like a JPEG (Joint Photographic Experts Group) method that can reduce the data size may be used. Also, known compression encoding such as an LZW (Lempel Ziv Welch) compression method (e.g., a GIF (Graphic Interchange Format) method) or an RLE (Run Length Encoding) method may be used.

In the above description, pixel data of the input image are used intact as the partial region image. For example, in order to protect a printed image from being copied, encrypted additional information may be embedded in an image. For encryption, for example, known encryption such as DES (Data Encryption Standard) that uses a 56-bit key may be used. Also, known encryption such as IDEA (International Data Encryption Algorithm) that uses a 128-bit key may be used.

In the above description, the image information D4 including the input image information and partial region information in addition to the partial region image is generated. However, the configuration of the image information D4 is not particularly limited as long as it includes data that allows the apparatus to restore the partial region image in restoration processing. For example, the image information D4 may include the compression method and encryption method of the partial region image and orientation information of an image upon adjusting the composition position.

<Additional Information Multiplexing Unit 15>

As described above, the additional information multiplexing unit 15 generates the image information D5 by embedding the image information D4 in the image information D2 as the output image. The additional information multiplexing unit 15 then outputs the generated image information D5 to the printer 16.

The embedding method is not limited to a method of embedding the additional information in a visible or an invisible state, and may use any method, as long as additional information can be embedded in an image, and this additional information can be extracted from the image embedded with the additional information.

For example, a case will be explained below wherein the image information D4 is embedded in the image information D2 to be indistinct to the human eye, so as to improve the appearance. The additional information multiplexing unit 15 divides a certain region in an image of the image information D2 into square blocks each defined by N pixels×N pixels, so that the image information D4 as additional information can be restored by executing frequency component analysis of textures for respective blocks upon decoding of the additional information. Then, the additional information multiplexing unit 15 changes a quantization threshold of error diffusion for each block in accordance with the sign of an additional information bit. Since this processing can generate textures, which cannot be generated by normal error diffusion, for respective blocks, the additional information can be embedded in the image information D2 so as to be indistinct to the human eye.

<Printer 16>

Upon reception of the image information D5, the printer 16 prints an image based on this image information D5 on a print sheet, and outputs the print result as the print material D6.

Note that the image output device according to this embodiment has been explained under the precondition of execution of borderless-print processing. Also, the image output device according to this embodiment is applicable to print processing of an image which includes a region to be deleted at the time of printing.

For example, upon execution of frame print processing, a part hidden behind a frame may be set as a "region to be deleted at the time of printing", and a delete region assumed at the time of printing and its surrounding region may be defined as a region which is hidden behind a frame and its surrounding region upon execution of the frame print processing.

<Overview of Image Reading Device>

An overview of the image reading device according to this embodiment will be described below.

Figure 2:
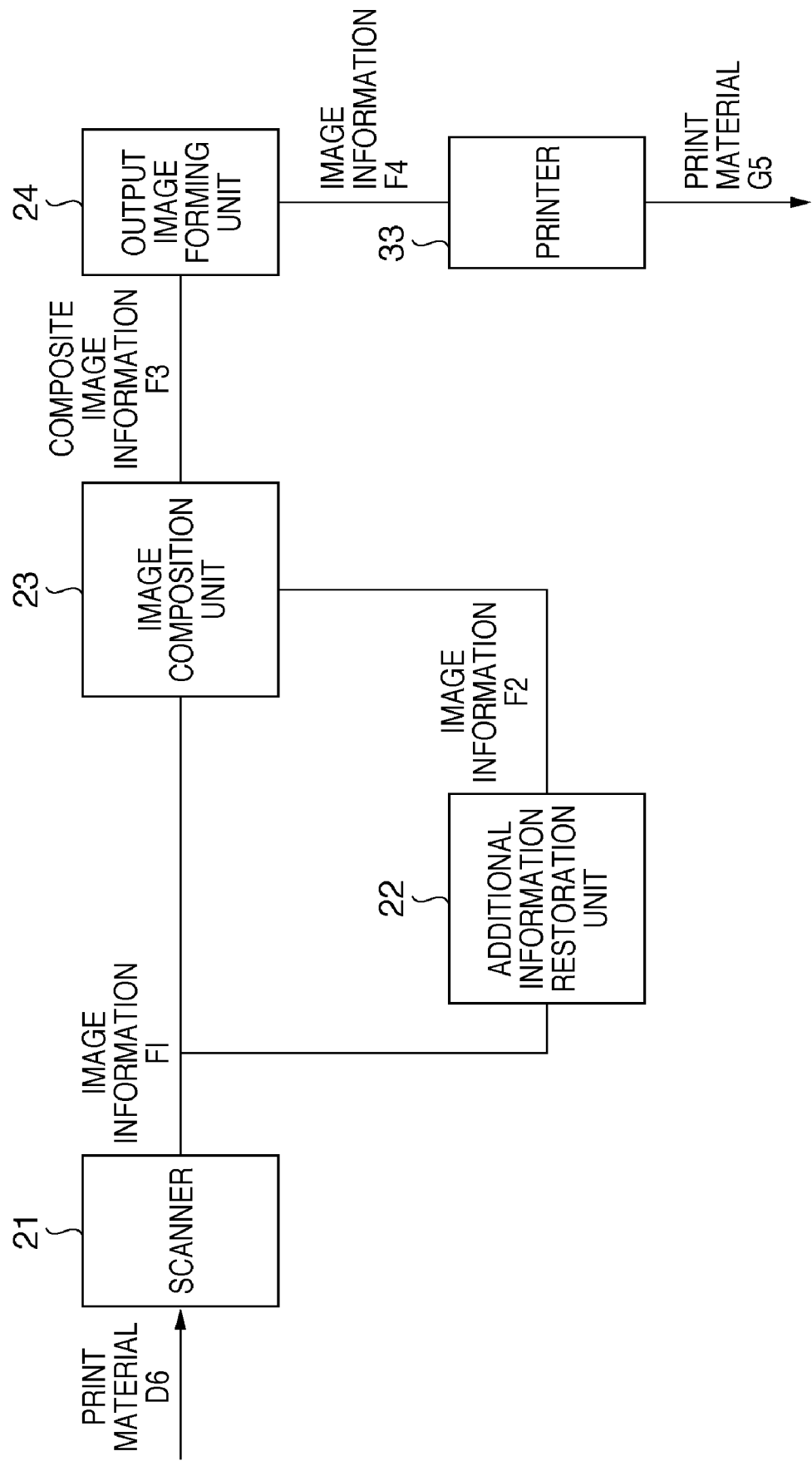
FIG. 2 is a block diagram showing an example of the functional arrangement of an image reading device according to the first embodiment of the present invention.

FIG. 2 is a block diagram showing an example of the functional arrangement of the image reading device according to this embodiment. As shown in FIG. 2, the image reading device according to this embodiment includes a scanner 21, an additional information restoration unit 22, an image composition unit 23, an output image forming unit 24, and a printer 33.

Figure 16:
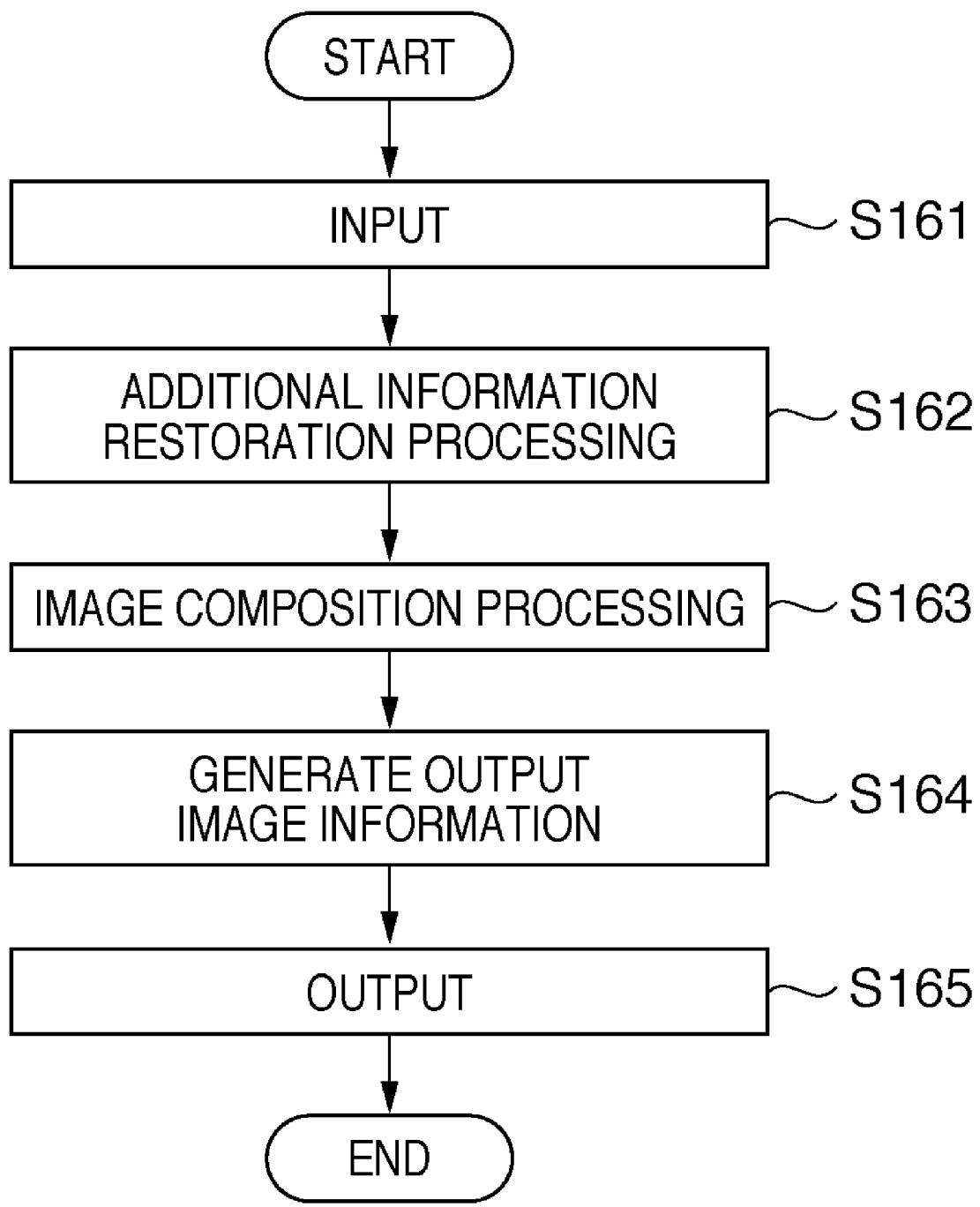
FIG. 16 is a flowchart showing processing to be executed by the image reading device according to the first embodiment of the present invention.

FIG. 16 is a flowchart of processing to be executed by the image reading device according to this embodiment.

The print material D6 output from the printer 16 is read using the scanner 21, and the read result is output to the additional information restoration unit 22 and the image composition unit 23 as image information F1. Therefore, in step S161 the additional information restoration unit 22 and the image composition unit 23 receive this image information F1.

In step S162, the additional information restoration unit 22 extracts the image information D4 embedded in the image information F1. The additional information restoration unit 22 outputs the image information D4 to the subsequent image composition unit 23 as image formation F2.

In step S163, the image composition unit 23 executes composition processing using the image information F1 and the image information F2 and generates composite image information F3. The image composition unit 23 outputs the generated composite image information F3 to the subsequent output image forming unit 24.

In step S164, the output image forming unit 24 executes resolution transformation processing of an image based on the composite image information F3 to fit the size of a print sheet, thus generating image information F4.

In step S165, the output image forming unit 24 outputs the generated image information F4 to the subsequent printer 33.

As a result, the printer 33 executes print processing using that image information F4, and prints an image indicated by the image information F4 on a print sheet. Note that the printer 33 may be either the same as or different from the printer 16.

In this embodiment, the output from the image composition unit 23 is input to the output image forming unit 24. Alternatively, the output from the image composition unit 23 may be input to the image input unit 11 shown in FIG. 1, and may be printed after an assumed delete region and its surrounding region are embedded as additional information upon execution of print processing again.

Details of the respective units shown in FIG. 2 will be described below.

<Scanner 21>

The scanner 21 reads information printed on a print material using an image sensor, and outputs the read result as image data. Note that the print material is a print sheet on which an image embedded with additional information is printed. The image sensor includes, e.g., a CCD (Charge Coupled Device) image sensor. Of course, the image sensor may include a CMOS (Complementary Metal Oxide Semiconductor) image sensor. As is well known, the image sensor is a device for reading an image as optical information, and converting the optical information into image data.

The scanner 21 reads the print material D6 as a document. The scanner 21 outputs the read result as image data. That image data is input to the additional information restoration unit 22 and the image composition unit 23 as the image information F1.

In this embodiment, the scanner is used to input information printed on the print material D6 to the image reading device as image data. However, the image data may be input to the image reading device using another device. For example, information printed on the print material D6 may be read as image data using a digital camera, a portable phone with a camera, a film scanner, or the like, and the read image data may be input to the image reading device. Note that it is indispensable to read the print material D6 with an image quality high enough to allow extraction of additional information embedded in an image printed on the print material D6.

<Additional Information Restoration Unit 22>

As described above, the additional information restoration unit 22 extracts additional information embedded in an image, and restores the extracted additional information.

Upon reception of the image information F1, the additional information restoration unit 22 extracts the image information D4 from that image information F1. As the extraction method, a method corresponding to the embedding side can be used, and the information is extracted by a method opposite to the embedding method. For example, the image information D4 is extracted by executing frequency component analysis of textures for respective blocks. Or for example, frequency component analysis of textures is executed for respective blocks so as to refer to the contents of the image information F1 for respective pixels, thus calculating a feature amount of the frequency component analysis result. Then, based on the calculated feature amount, embedded block positions are detected. The degrees of matching of textures set for respective detected block positions with frequency components are compared, thereby extracting embedded data. The extracted data for respective blocks are merged to form one data sequence. Image information can be restored from the extracted data sequence by prescribing the allocation and contents of embedded data in advance.

In the above description, the additional information restoration method uses a method of restoring additional information by executing frequency component analysis for respective blocks. However, any other processes may be used as long as a known restoration method as processing that can extract additional information from an image read by the image reading device, and can restore an image embedded with the additional information is used.

The additional information restoration unit 22 outputs the extracted image information D4 to the subsequent image composition unit 23 as the image information F2.

<Image Composition Unit 23>

As described above, the image composition unit 23 executes composition processing using the image information F1 from the scanner 21 and the image information F2 from the additional information restoration unit 22, and outputs the composite image information F3.

The composition processing using the image information F1 and the image information F2 will be described in detail below.

FIGS. 3A to 3D are views for explaining processing for restoring an input image input on the image output device side by executing the composition processing using the image information F1 obtained as a result of borderless-print processing of an input image while a print sheet is shifted, and the image information F2.

Figure 3A:
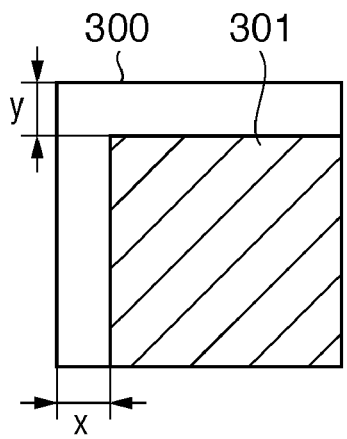
FIGS. 3A to 3D are views for explaining processing for restoring an input image input on the image output device side by executing composition processing using image information F1 obtained as a result of borderless-print processing of an input image while a print sheet is shifted, and image information F2.

FIG. 3A is a view showing the image information F1 obtained as the borderless-print result of an input image while the print sheet is shifted. Reference numeral 300 denotes an overall image indicated by the image information F1; and reference numeral 301 denotes a region where the input image is printed in the overall image 300. In FIG. 3A, an image in the region 301 is shifted with respect to the print sheet rightward by x from the left end of the overall image 300, and downward by y from the top end. That is, at the time of printing of the input image, the print sheet was placed at a position which was shifted leftward by x and upward by y from a position where that sheet is to be placed at the time of printing. Since a technique for calculating such shift amounts is a state-of-the-art technique, a description thereof will not be given.

Figure 3B:
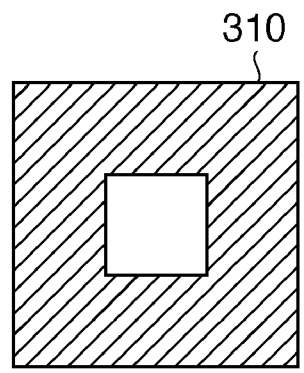
Figure 3C:
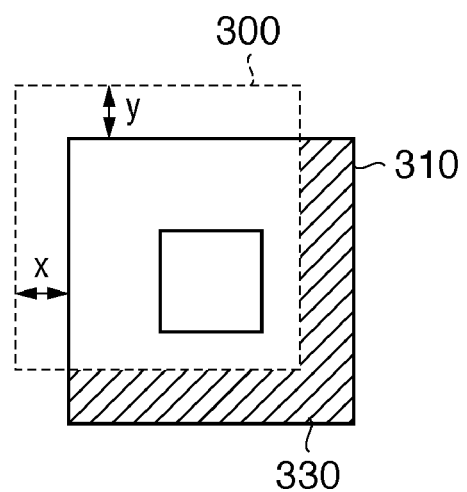

FIG. 3B is a view showing a partial region image. Reference numeral 310 denotes a partial region image. In the overall image 300, a region deleted from the input image (a non-print target region in the input image) is a hatched region 330 in FIG. 3C. This region 330 is calculated as follows. That is, after the partial region image 310 and the overall image 300 are overlaid so that their four corners overlap each other, when the overall image 300 is shifted in the directions opposite to the above shifts (leftward by x and upward by y), a region of the partial region image 310 that does not overlap the overall image 300 is the region 330.

Figure 3D:
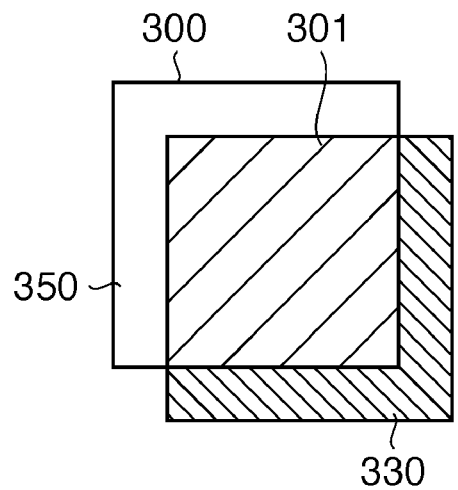
Figure 4:
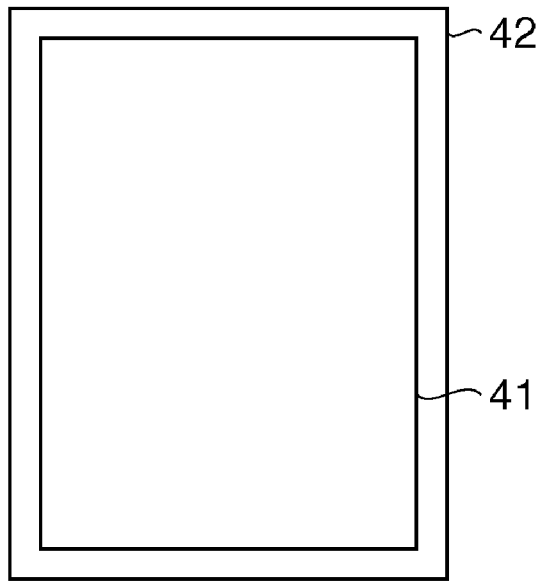
FIG. 4 is a view showing a print sheet 41 and output image 42.

Data of the region 330 calculated in this way is read out from the partial region image 310, and is merged with the overall image 300 from a lower right position (specified from the rightward and downward directions corresponding to the shift directions). That is, as shown in FIG. 3D, an image within a region obtained by merging the region 301 and the region 330 can be restored as an input image. After that, a region 350 as a non-image part in the overall image 300 is deleted, thus restoring the input image.

The image composition unit 23 restores the input image in this way, and outputs the restored input image to the subsequent output image forming unit 24 as the composite image information F3.

Note that the method of restoring the input image is not limited to the aforementioned method, and other methods may be used. Some methods of restoring the input image will be described below.

The first method (method 1) will be described first. With this method, the image output device side embeds a plurality of alignment markers in an image indicated by the image information D2 as invisible embedded information (invisible markers). In this case, assume that the invisible markers are embedded at predetermined four corners in the image indicated by the image information D2.

FIGS. 12A to 12D are views for explaining processing for restoring an input image by method 1.

Figure 12D:
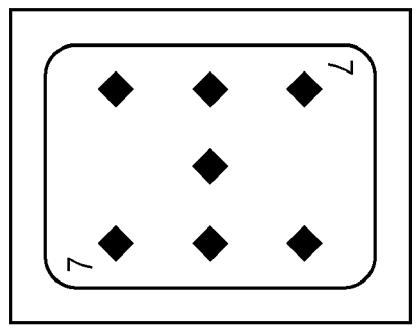
FIGS. 12A to 12D are views for explaining processing for restoring an input image by method 1.
Figure 12C:
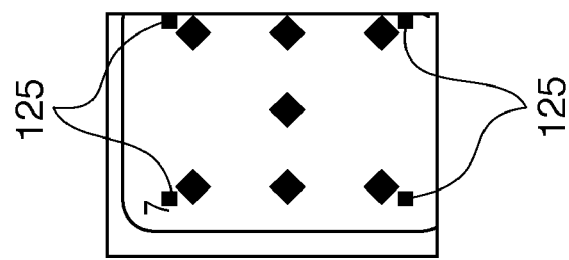
Figure 12B:
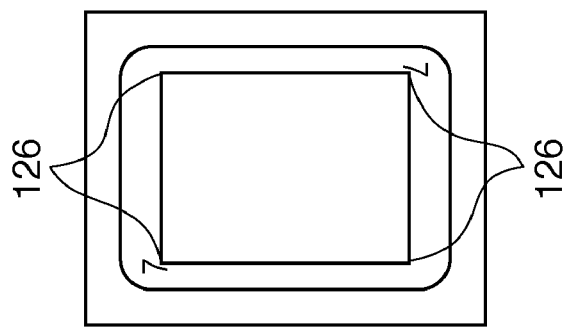
Figure 12A:
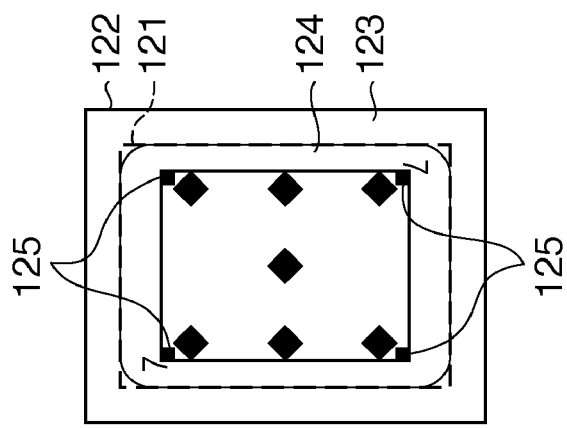

FIG. 12A shows an output image 122 embedded with a plurality of invisible markers, a circumscribed rectangle 121 of a region where characters/line images are described on the output image 122, and invisible markers 125 embedded at the four corners (or their neighboring positions) of that circumscribed rectangle 121. Normally, since the output image 122 is generated so that the size of the circumscribed rectangle 121 matches that of a print sheet, the size of the circumscribed rectangle 121 is that of the print sheet. In this case, reference numeral 123 denotes a non-print target region on the output image 122; and reference numeral 124 denotes a surrounding region of the region 123 on the output image 122.

FIG. 12B shows positions 126 of the invisible markers at the four corners on the partial region image.

FIG. 12C shows the print result of the output image 122 on a print sheet which is placed to be shifted from a position where that print sheet is to be originally placed. As shown in FIG. 12C, the invisible markers 125 are printed at positions deviated from the four corners on the print sheet.

When the image shown in FIG. 12C is input to the image composition unit 23 as the image information F1, the image composition unit 23 executes the following processing.

The image composition unit 23 detects the positions of the invisible markers 125 from the image indicated by the image information F1.

The image composition unit 23 then restores the partial region image from the image information F2 received from the additional information restoration unit 22. The image composition unit 23 composites the image indicated by the image information F1 on the partial region image so as to align the detected positions of the invisible markers 125 to the positions 126 on the restored partial region image. In this way, the input image can be restored, as shown in FIG. 12D. Note that as for an overlap part of images, either the partial region image or the image indicated by the image information F1 may be deleted or they may be composited by setting a ratio.

The second method (method 2) will be described below. With this method, the image output device side embeds an alignment pattern in the image indicated by the image information D2 as invisible embedded information (invisible pattern).

FIGS. 13A to 13D are views for explaining processing for restoring an input image by method 2.

Figure 13D:
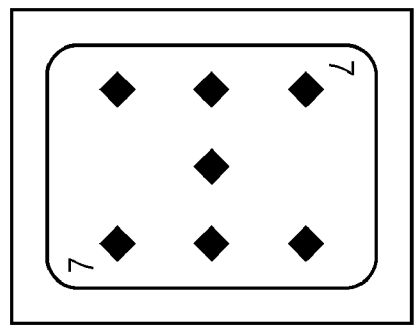
FIGS. 13A to 13D are views for explaining processing for restoring an input image by method 2.
Figure 13C:
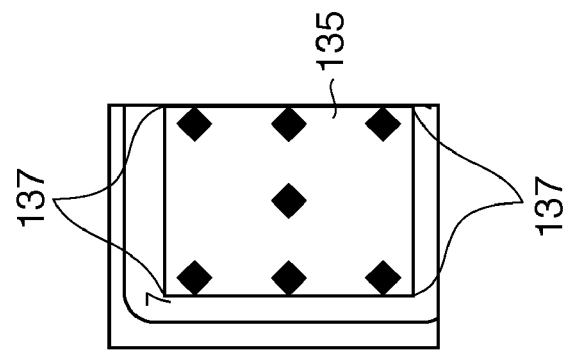
Figure 13B:
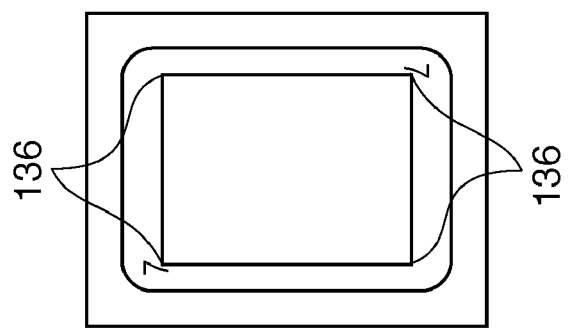
Figure 13A:
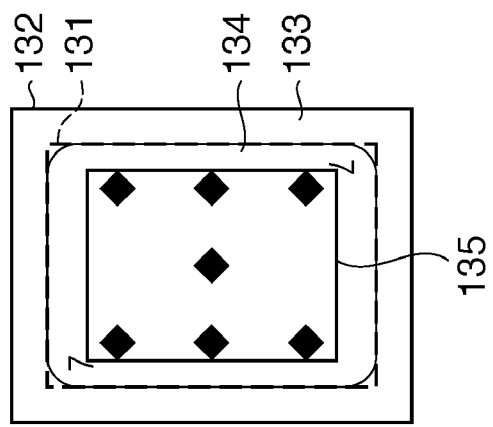

FIG. 13A shows an output image 132 embedded with an invisible pattern 135, a circumscribed rectangle 131 of a region where characters/line images are described on the output image 132, and the invisible pattern 135 embedded in this circumscribed rectangle 131. Normally, since the output image 132 is generated so that the size of the circumscribed rectangle 131 matches that of a print sheet, the size of the circumscribed rectangle 131 becomes that of the print sheet. In this case, reference numeral 133 denotes a non-print target region on the output image 132; and reference numeral 134 denotes a surrounding region of the region 133 on the output image 132.

FIG. 13B shows positions 136 of the four corners of the invisible pattern 135 on the partial region image.

FIG. 13C shows the print result of the output image 132 on a print sheet which is placed to be shifted from a position where that print sheet is to be originally placed. As shown in FIG. 13C, the four corners of the invisible pattern 135 are deviated from those on the print sheet.

When the image shown in FIG. 13C is input to the image composition unit 23 as the image information F1, the image composition unit 23 executes the following processing.

The image composition unit 23 detects positions 137 of the four corners of the invisible pattern 135 from the image indicated by the image information F1.

The image composition unit 23 restores the partial region image from the image information F2 received from the additional information restoration unit 22. Then, the image composition unit 23 composites the image indicated by the image information F1 on the partial region image so as to align the detected positions 137 of the four corners of the invisible pattern 135 to the positions 136 of the four corners of the invisible pattern 135 on the restored partial region image. In this way, the input image can be restored, as shown in FIG. 13D. Note that as for an overlap part of images, either the partial region image or the image indicated by the image information F1 may be deleted or they may be composited by setting a ratio.

In the above description, alignment in image composition is done using alignment information such as the invisible markers or invisible pattern. However, the present invention is not limited to such invisible information, and any other processes may be used if a method of detecting positions is available.

In the above description, the alignment method in image composition is executed using the four invisible markers. However, the present invention is not limited to the four invisible markers, and any other processes may be used if a method of detecting positions is available.

In the above description, the alignment method in image composition is executed using the invisible markers. For example, the surrounding region of the delete region overlaps upon alignment, and the positions may be aligned by executing pattern matching of an overlapping region.

<Output Image Forming Unit 24>

Upon reception of the composite image information F3 output from the image composition unit 23, the output image forming unit 24 executes resolution transformation of an image indicated by that composite image information F3. This resolution transformation executes the same processing as that executed by the output image forming unit 12. The output image forming unit 24 outputs the image after the resolution transformation to the subsequent printer 33 as the image information F4.

<Printer 33>

Upon reception of the image information F4, the printer 33 prints an image based on that image information F4 on a print sheet, and outputs the print result as a print material G5.

As described above, according to this embodiment, even when borderless-print processing is executed to be shifted from a non-print target region (delete region) which is set in advance, since the assumed delete region and its surrounding region are embedded as additional information, an input image before printing can be restored.

Principal parts of this embodiment will be summarized below. More specifically, a print image is generated based on an input image, and an image region which is not to be printed upon printing the generated print image on a print sheet is specified. Then, partial region information indicating a region obtained by merging a region on the input image corresponding to the specified image region, and a surrounding region of this region on the input image is generated. Embedded information including the partial region information is generated, and is embedded in the print image. The print image embedded with the embedded information is output to a printing device.

Then, a print material as the print result by the printing device is acquired as image data, the embedded information is extracted from the acquired image data, and the partial region information is restored from the extracted embedded information. Then, by complementing a partial image deleted from the input image in an image indicated by that image data using the restored partial region information, the input image is restored. A print image is generated based on the restored input image, and the generated print image is output to the printing device.

Also, principal parts of this embodiment are as follows. More specifically, a print image is generated based on an input image, and an image region which is not to be printed upon printing the generated print image on a print sheet is specified. Then, region information indicating a region obtained by merging a region on the input image corresponding to the specified image region, and a surrounding region of this region on the input image is generated. Embedded information including the region information is generated, and the embedded information and alignment information are embedded in the print image. The print image embedded with the embedded information and alignment information is output to a printing device.

Then, a print material as the print result by the printing device is acquired as image data, the embedded information is extracted from the acquired image data, and the region information is restored from the extracted embedded information. Also, the alignment information is extracted from the image data. A partial region deleted from the input image in an image indicated by the image data is specified from the restored region information using the extracted alignment information, and the image indicated by the image data is complemented using the specified partial image, thus restoring the input image. A print image is generated based on the restored input image, and the generated print image is output to the printing device.

Second Embodiment

In the first embodiment, even when borderless-print processing is executed to be shifted from a delete region which is set in advance, an input image before printing can be restored by embedding the assumed delete region and its surrounding region as additional information. However, in case of the first embodiment, if the image reading device has poor reading precision, the read image may be distorted or stretched compared to the printed image. In this case, a problem of shifts of the composition positions is posed upon execution of image composition. This embodiment has been made in consideration of such a situation.

Only the operation of the image composition unit 23 included in the image reading device of this embodiment is different from the first embodiment. That is, the operations of this embodiment except for that of the image composition unit 23 are the same as those of the first embodiment.

Therefore, the operation of the image composition unit 23 according to this embodiment will be described below. In this embodiment, when the read image is distorted or stretched compared to the printed image, the image composition unit 23 corrects such an image before image composition.

<Operation of Image Composition Unit 23 According to This Embodiment>

In this embodiment, the image composition unit 23 receives image information F1 from the scanner 21, and the image information F2 from the additional information restoration unit 22 as in the first embodiment. Then, the image composition unit 23 executes composition processing based on the image information F1 and the image information F2 to generate composite image information F3 as in the first embodiment. However, in this embodiment, the image composition unit 23 executes processing for correcting a distortion or stretching of an image indicated by the image information F1 during the composition processing, in addition to the first embodiment.

FIGS. 14A to 14D are views for explaining processing to be executed by the image composition unit 23 according to this embodiment.

Figure 14A:
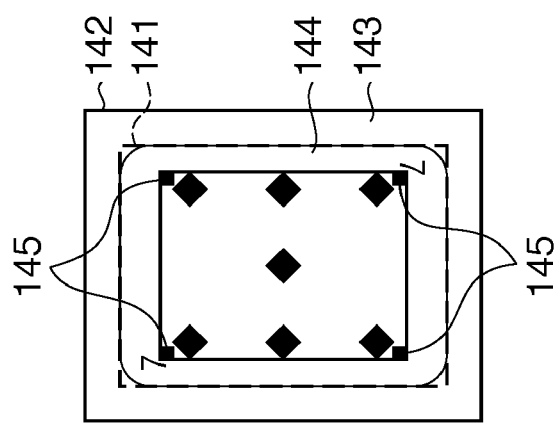
FIGS. 14A to 14D are views for explaining processing to be executed by an image composition unit 23 according to the second embodiment of the present invention.

FIG. 14A shows an output image 142 embedded with a plurality of invisible markers 145, a circumscribed rectangle 141 of a region where characters/line images are described on the output image 142, and the invisible markers 145 embedded in that circumscribed rectangle 141. Normally, since the output image 142 is generated so that the size of the circumscribed rectangle 141 matches that of a print sheet, the size of the circumscribed rectangle 141 is that of the print sheet. In this case, reference numeral 143 denotes a non-print target region on the output image 142; and reference numeral 144 denotes a surrounding region of the region 143 on the output image 142.

Figure 14B:
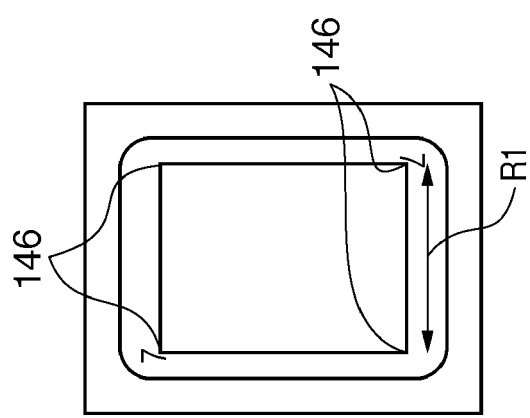

FIG. 14B shows positions 146 of the invisible markers at the four corners of a partial region image. Reference numeral R1 denotes a distance between the invisible markers 145 in the horizontal direction.

Figure 14C:
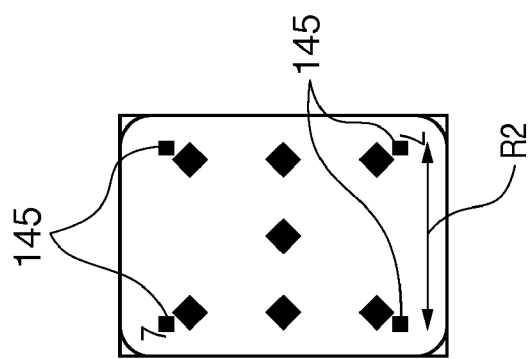
Figure 14D:
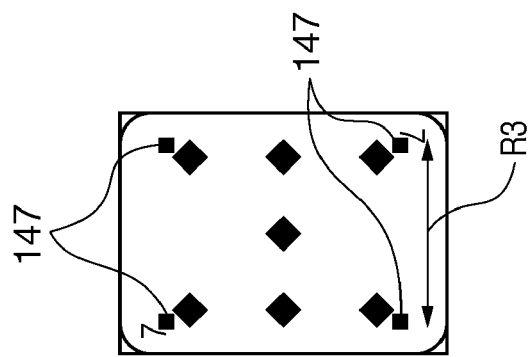

FIG. 14C shows a print material D6. In FIG. 14C, the distance between the invisible markers 145 is R2. FIG. 14D shows an image indicated by the image information F1 obtained when that print material D6 is read by the scanner 21. In FIG. 14D, the distance between invisible markers 147 is R3. That is, R2>R3, and the width in the horizontal direction of the image read by the scanner 21 is reduced. Note that R2=R1.

In this case, the image composition unit 23 operates as follows.

The image composition unit 23 detects the positions of the four corners of the invisible markers 147 from the image (FIG. 14D) indicated by the image information F1.

The image composition unit 23 restores the partial region image (FIG. 14B) from the image information F2 received from the additional information restoration unit 22. The image composition unit 23 corrects a distortion or stretching of the image indicated by the image information F1 to satisfy R1=R3 using the distance R1 between the invisible markers (between the positions 146) in the restored partial region image, and the distance R3 between the detected invisible markers 147. Then, the image composition unit 23 executes composition processing using the corrected image and the partial region image as in the first embodiment, thus generating the composite image information F3.

In this way, since a distortion of the read image can be corrected using the positions of the invisible markers upon execution of image composition, the image composition can be implemented to be free from any shifts of the composition positions.

In this embodiment, an invisible pattern may be embedded in an image in place of the invisible markers. For example, invisible patterns are embedded for respective blocks, and a distortion of an image can be corrected by adjusting the block positions of the read image to assumed block positions.

This embodiment has exemplified the case in which additional information is extracted from a borderless-printed sheet, and image composition is executed. However, a case in which the read image is distorted or stretched compared to the printed image is not limited to borderless-print processing. For example, in frame print processing that prints an image by replacing a part of an input image by a frame image, the part of the input image replaced by the frame image is embedded in a print image, and that print image is printed. In this case, upon reading the frame-printed sheet using an image reading device, if the read image is distorted, that image may be shifted at the time of image composition.

As described above, according to this embodiment, the case in which borderless-print processing is executed to be shifted from a delete region which is set in advance, and an image read by the image reading device is distorted or stretched due to poor reading performance can be coped with. That is, by adjusting the composition positions using invisible markers or patterns as additional information embedded in an image, an input image before printing can be restored.

Third Embodiment

The respective units (except for the printer 16) shown in FIG. 1, and those (except for the scanner 21 and printer 33) shown in FIG. 2 may be implemented by hardware or some or all of these units may be implemented by software. In the latter case, such software is stored in a memory included in a computer such as a PC, and when a CPU or the like included in this computer executes processing using the stored software, the computer can implement the functions of the devices shown in FIGS. 1 and 2.

FIG. 17 is a block diagram showing an example of the hardware arrangement of a computer applicable to the image output device and image reading device.

To a computer 170, a printer 17a and scanner 17b are connected. This printer 17a serves as the printer 16 shown in FIG. 1, and the printer 33 shown in FIG. 2. The scanner 17b serves as the scanner 21 shown in FIG. 2.

Respective units which configure the computer 170 will be described below.

A CPU 172 controls the overall computer 170 using computer programs and data stored in a RAM 174 and ROM 173, and executes respective processes which have been described as those to be implemented by the image output device and image reading device.

The ROM 173 stores setting data, a boot program, and the like of the computer 170.

The RAM 174 has an area for temporarily storing computer programs and data loaded from a secondary storage device 175, and an area for temporarily storing image data and the like input from the scanner 17b via an I/O IF 179. Furthermore, the RAM 174 also has a work area used by the CPU 172 upon execution of respective processes. That is, the RAM 174 can provide various areas as needed.

The secondary storage device 175 is a large-capacity information storage device represented by a hard disk drive. The secondary storage device 175 stores an OS (operating system), and computer programs and data which make the CPU 172 implement the functions of the respective units (except for the printer 16) shown in FIG. 1, and those (except for the scanner 21 and printer 33) shown in FIG. 2. The computer programs and data stored in the secondary storage device 175 are loaded onto the RAM 174 as needed under the control of the CPU 172, and are to be processed by the CPU 172.

A display 176 includes a CRT or liquid crystal display, and can display the processing result of the CPU 172 by means of images and characters. For example, when the user designates a partial region in the region setting unit 13, the display 176 displays an input image, and also a GUI used to designate a partial region on that input image.

A keyboard 177 and mouse 178 are examples of pointing devices which are used to input various instructions to the CPU 172 when the user operates them. For example, when the user designates a partial region in the region setting unit 13, he or she can designate the partial region using the keyboard 177 or mouse 178.

To the I/O IF 179, the printer 17a and scanner 17b are connected. The computer 170 transfers image information to the printer 17a and acquires image information from the scanner 17b via this I/O IF 179.

Reference numeral 171 denotes a bus which interconnects the aforementioned units.

Note that the hardware arrangement of the computer 170 is not limited to the arrangement shown in FIG. 17, and various other arrangements may be used as long as they can implement equivalent functions.

Other Embodiments

The objects of the present invention can be achieved as follows. That is, a recording medium (or storage medium) that records program codes (computer programs) of software required to implement the functions of the aforementioned embodiments is supplied to a system or apparatus. That storage medium is a computer-readable storage medium, needless to say. A computer (or a CPU or MPU) of that system or apparatus reads out and executes the program codes stored in the recording medium. In this case, the program codes themselves read out from the recording medium implement the functions of the aforementioned embodiments, and the recording medium that records the program codes constitutes the present invention.

When the computer executes the readout program codes, an operating system (OS) or the like, which runs on the computer, executes some or all of actual processes based on instructions of these program codes. The present invention also includes a case in which the functions of the aforementioned embodiments are implemented by these processes.

Furthermore, assume that the program codes read out from the recording medium are written in a memory equipped on a function expansion card or function expansion unit which is inserted in or connected to the computer. After that, a CPU or the like equipped on the function expansion card or unit executes some or all of actual processes based on instructions of these program codes, thereby implementing the functions of the aforementioned embodiments.

When the present invention is applied to the recording medium, that recording medium stores program codes corresponding to the aforementioned flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-068353 filed Mar. 17, 2008, which is hereby incorporated by reference herein in its entirety.

What is claimed is:

1. An image processing apparatus comprising:
a unit which generates a print image based on an input image;
a generation unit which specifies an image region, which is not to be printed when the print image is printed on a print sheet, and generates region information indicating a region obtained by merging a region on the input image corresponding to the specified image region, and a surrounding region of that region on the input image;
a unit which generates embedded information including the region information;
a unit which embeds the embedded information in the print image; and
a unit which outputs the print image embedded with the embedded information to a printing device.

2. The apparatus according to claim 1, further comprising:
a unit which acquires, as image data, printed material as a print result of the operation of the printing device;
a unit which extracts the embedded information from the image data, and restores the region information from the extracted embedded information;
a restoration unit which restores the input image by complementing a partial image deleted from the input image in an image indicated by the image data using the restored region information; and
a unit which generates a print image based on the input image restored by said restoration unit, and outputs the generated print image to the printing device.

3. The apparatus according to claim 2, wherein said restoration unit restores the input image by specifying a partial image deleted from the input image in the image indicated by the image data from the restored region information, and complementing the image indicated by the image data using the specified partial image.

4. An image processing apparatus comprising:
a unit which generates a print image based on an input image;
a generation unit which specifies an image region, which is not to be printed when the print image is printed on a print sheet, and generates region information indicating a region obtained by merging a region on the input image corresponding to the specified image region, and a surrounding region of that region on the input image;

a unit which generates embedded information including the region information;

a unit which embeds the embedded information and alignment information in the print image; and a unit which outputs the print image embedded with the embedded information and the alignment information to a printing device.

5. The apparatus according to claim 4, further comprising:

a unit which acquires, as image data, printed material as a print result of the operation of the printing device;

a unit which extracts the embedded information from the image data, and restores the region information from the extracted embedded information;

a unit which extracts the alignment information from the image data;

a restoration unit which restores the input image by specifying a partial image deleted from the input image in an image indicated by the image data from the restored region information using the extracted alignment information, and complementing the image indicated by the image data using the specified partial image; and a unit which generates a print image based on the input image restored by said restoration unit, and outputs the generated print image to the printing device.

6. The apparatus according to claim 5, wherein said restoration unit comprises:

a unit which corrects the image indicated by the image data using the extracted alignment information, and said restoration unit restores the input image by specifying a partial image deleted from the input image in the corrected image from the restored region information, and complementing the image indicated by the image data using the specified partial image.

7. The apparatus according to claim 5, wherein the alignment information includes invisible markers embedded at four corners of a region where a character/line image is in the print image.

8. The apparatus according to claim 5, wherein the alignment information includes an invisible pattern embedded in a region where a character/line image is in the print image.

9. The apparatus according to claim 1, wherein said generation unit specifies an image region which is not to be printed when the print image obtained by enlarging the input image to a size larger than a size of the print sheet is printed on the print sheet by the printing device, said generation unit calculates a region on the input image corresponding to the specified image region based on a ratio of sizes of the input image and the print image, said generation unit calculates a region obtained by merging the region on the input image and a surrounding region of that region on the input image as a partial region, and said generation unit generates an image obtained by extracting only the partial region from the input image as the region information.

10. An image processing method comprising:

a step of generating a print image based on an input image;

a generation step of specifying an image region, which is not to be printed when the print image is printed on a print sheet, and generating region information indicating a region obtained by merging a region on the input image corresponding to the specified image region, and a surrounding region of that region on the input image;

a step of generating embedded information including the region information;

a step of embedding the embedded information in the print image; and a step of outputting the print image embedded with the embedded information to a printing device.

11. The method according to claim 10, further comprising:

a step of acquiring, as image data, printed material as a print result of the operation of the printing device;

a step of extracting the embedded information from the image data, and restoring the region information from the extracted embedded information;

a restoration step of restoring the input image by complementing a partial image deleted from the input image in an image indicated by the image data using the restored region information; and a step of generating a print image based on the input image restored in the restoration step, and outputting the generated print image to the printing device.

12. An image processing method comprising:

a step of generating a print image based on an input image;

a generation step of specifying an image region, which is not to be printed when the print image is printed on a print sheet, and generating region information indicating a region obtained by merging a region on the input image corresponding to the specified image region, and a surrounding region of that region on the input image;

a step of generating embedded information including the region information;

a step of embedding the embedded information and alignment information in the print image; and a step of outputting the print image embedded with the embedded information and the alignment information to a printing device.

13. The method according to claim 12, further comprising:

a step of acquiring, as image data, printed material as a print result of the operation of the printing device;

a step of extracting the embedded information from the image data, and restoring the region information from the extracted embedded information;

a step of extracting the alignment information from the image data;

a restoration step of restoring the input image by specifying a partial image deleted from the input image in an image indicated by the image data from the restored region information using the extracted alignment information, and complementing the image indicated by the image data using the specified partial image; and a step of generating a print image based on the input image restored in the restoration step, and outputting the generated print image to the printing device.

14. A non-transitory computer-readable storage medium storing a computer program for making a computer function as respective units included in an image processing apparatus according to claim 1.

* * * * *